United States Patent [19]

Landwehr et al.

[11] 3,926,463
[45] Dec. 16, 1975

[54] SHOCK ABSORBING BUFFER ASSEMBLY

[75] Inventors: DeWayne A. Landwehr; Gary P. Zeller, both of Anderson, Ind.

[73] Assignee: General Motors Corporation, Detroit, Mich.

[22] Filed: Oct. 11, 1974

[21] Appl. No.: 514,080

[52] U.S. Cl. ............... 293/63; 188/1 C; 267/139; 293/1; 293/60; 293/85; 293/88; 296/28 E; 296/31 R
[51] Int. Cl.² ............... B60R 19/08; B60R 21/14; B61F 19/04; B62D 29/04
[58] Field of Search ........ 188/1 C; 267/139; 293/1, 293/60, 62, 63, 69 R, 70, 71 R, 71 P, 72, 85, 88, 101; 296/28 R, 28 E, 31 R, 31 P

[56] References Cited
UNITED STATES PATENTS

| | | | |
|---|---|---|---|
| 1,754,112 | 4/1930 | Lusse | 293/71 R |
| 3,493,257 | 2/1970 | Fitzgerald et al. | 293/63 X |
| 3,512,822 | 5/1970 | Rich et al. | 293/70 X |
| 3,587,787 | 6/1971 | Rich et al. | 188/1 C |
| 3,744,835 | 7/1973 | Carbone et al. | 293/1 |
| 3,809,420 | 5/1974 | Weller | 293/70 |
| 3,836,192 | 9/1974 | Wilfert | 296/28 R |
| 3,847,426 | 11/1974 | McGettigan | 188/1 C X |
| 3,850,474 | 11/1974 | Welch | 296/31 P |
| 3,876,243 | 4/1975 | Bell | 293/71 P |
| 3,901,543 | 8/1975 | Norlin | 293/71 R |
| R27,073 | 2/1971 | Schimmel et al. | 188/1 C X |

FOREIGN PATENTS OR APPLICATIONS

| | | | |
|---|---|---|---|
| 1,923,305 | 10/1970 | Germany | 293/71 R |
| 346,267 | 7/1972 | Sweden | 293/71 R |

*Primary Examiner*—M. Henson Wood, Jr.
*Assistant Examiner*—Howard Beltran
*Attorney, Agent, or Firm*—Charles R. White

[57] ABSTRACT

An elongated one-piece plastic grid of longitudinally extending cells provides a resilient primary energy-absorbing medium in a buffer assembly which projects from a vehicle body for absorbing impact forces to minimize vehicle damage. Differing cell sizes, cell wall thickness, and cell wall draft angles are provided to optimize resistance to penetration and force transmittal levels. The grid has front and rear mounting walls at the ends of predetermined cells to facilitate grid attachment to a backing beam and to provide walls for the attachment of a spreader plate assembly that distributes localized impact forces to a large number of cells to reduce impact penetration. A thin walled flexible plastic facia, fitted over the spreader plate assembly and over horizontally extending wing portions of the cellular grid protects the grid and provides for a finished appearance.

5 Claims, 8 Drawing Figures

SHOCK ABSORBING BUFFER ASSEMBLY

This invention relates to energy absorbing devices and more particularly to a new and improved self-restoring energy absorbing cellular grid mounted on a vehicle optimizing penetration protection and force transmittal levels before damage to the vehicle body work or other protected vehicle components.

Prior to the present invention, there have been many energy management systems used to absorb impact energy resulting from a vehicle striking an object or being struck by other vehicles and objects. One widely used system incorporates a pair of energy absorbing cylinders which support conventional rigid bumper structure and which control the rate of travel of the bumper inwardly in response to impact to dissipate impact energy. In another system there is a resilient energy absorbing media backed by a projecting heavy duty rigid support bar which cushions and dissipates energy of impact. Another prior art system employs a plurality of identical plastic energy absorbing cellular blocks mounted end to end laterally on an exterior bumper to provide for absorption of impact energy. While these prior systems are satisfactory and successfully manage impact energy, they are often bulky in appearance and have added substantially to the vehicle length, weight and costs.

An objective of this invention is to provide a new and improved energy multicelled grid that eliminates the heavy external bumpers of the prior art constructions so that overall vehicle length is not increased and so that the increase in vehicle weight is minimized. The grid may be readily shaped for styling purposes and employed as an entire soft end of a vehicle. The grid supports and provides a yieldable self-restoring backing for a force spreader plate and a flexible plastic facia covering and protecting the interior components of a system employing the grid. The facia provides a smooth and pleasing appearance which may be painted the color of the body to simulate vehicle body work. With this invention effective energy absorption with minimized damage to the vehicle or to the components of the energy absorbing assembly is provided and at the same time a reduction in cost over previously utilized self-restoring energy-absorbing units can be achieved.

More specifically this invention features a horizontally-extending one-piece plastic grid of longitudinally extending cells, each generally rectilinear in cross section, that forms the primary energy absorbing medium of this invention. The grid may be injection molded from an olefin material to form an impact cushion which has a low elastic modulus and large capacity for storing energy. The cellular grid is preferably supported interiorly of the vehicle body on a support beam and has a front horizontal portion spaced forwardly from the vehicle body so that objects deflecting the grid will not contact and cause damage to the vehicle body work. The projecting forward portions of the cellular grid are shaped to enhance vehicle body styling and provide for the production of an effective energy absorber. The arrangement, size and draft of the cells of the grid are selected to assure good impact absorption and recovery characteristics under repeated low speed collisions. The grid features a central portion comprising a box of rows of cells and left and right wings, each comprising a single row of cells, swept back from the central portion. The cells of the central portion of the grid extend longitudinally and form a primary portion to absorb the energy of a 5 mph straight-ahead impact. Such impact forces may be advantageously distributed to the cells by a spreader plate assembly having a steel backing plate fitted up against and fastened to the front end of the central portion of the grid. Low speed corner type impacts are effectively absorbed directly by the wing portions of the grid without involving the spreader plate. To further provide for improved energy absorption and to protect the vehicle body, the spreader plate assembly has molded thereon a pair of elastomeric vertically-extending guards which are connected by a forwardly-projecting top cross bar. These resilient elastomeric parts of the spreader plate provide improved protection from minor impacts in which there is little or no deflection of the cellular grid. The grid is an elastic body which gradually recovers to its original shape when the impact load is removed so that the components of this system are returned to their original position. The forward portions of the cellular grid and the spreader plate are covered with a thin walled plastic facia which fits over the exterior of the components to provide a smooth and streamlined exterior surface which matches and simulates vehicle body work. This facia is preferably peripherally attached to the vehicle body and provides continuous uninterrupted body lines.

One feature, advantage and object of this invention is to provide a new and improved self-restorable energy absorbing cushion for vehicles comprising a grid of elongated cells rectilinear in lateral cross section having different walls with different draft angles so that wall thickness can be appropriately tailored in different cells to effectively limit the amount of penetration by a predetermined force striking the cushion as well as the level of force transmittal by the cushion to the vehicle while minimizing the amount of material used to form the cushion.

Another feature, advantage and object of this invention is to provide a new and improved self-restoring energy absorbing cushion mounted on a vehicle having a grid comprising a network of interconnected and longitudinally extending cells directed outwardly from a vehicle body which have different draft angles, wall thicknesses and cell sizes to meet specific energy requirements for different portions of the grid.

Another feature, object and advantage of this invention is to provide a new and improved one piece energy absorbing grid that has a plurality of longitudinally extending cells with selected cells adjacent to each other forming first grid portions having wall thicknesses greater than other cells forming second grid portions to provide increased energy absorbing capacity as compared to the second grid portions.

Another feature, object and advantage of this invention is to provide a new and improved energy absorbing cellular grid for vehicles with predetermined cells having integral front or rear walls which facilitates assembly, which can be readily replaced if damaged, which is low in weight, and which provides styling freedom.

Another feature, object and advantage of this invention is to provide a new and improved energy absorbing grid which has a plurality of longitudinally extending cells open at both front and rear ends and which has other cells with front and rear attaching walls so that the grid may be readily attached to a support and in turn provide a support for a force spreading plate.

These and other features, objects and advantages of this invention will be more apparent to those skilled in the art from the following detailed description and drawings, in which.

Figure 1:
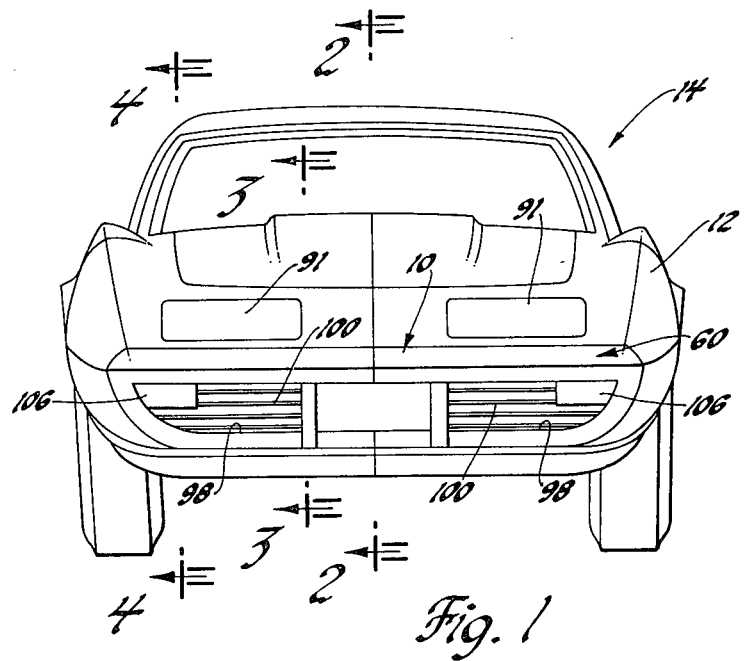
FIG. 1 is a front elevational view of a vehicle incorporating this invention.

Referring in detail to the drawings, there is shown an energy absorbing assembly 10 that extends horizontally across the front of the body 12 of a vehicle 14 and longitudinally from a recessed location within the body to a forward location from the body to provide impact protection for the entire front end of the vehicle. The energy absorbing assembly includes a steel support beam 16 that is secured in a recessed location in the vehicle body by support structure 18 that is in turn secured to the side rails 20 of the vehicle frame. The support beam 16 has an enlarged box-like central portion 22 providing a center pocket 24 and a pair of laterally extending channeled wing portions 26 that gradually sweep rearwardly from either side of the central portion to terminal end portions 27. The support beam being opened in its entirety at its front or forward end provides a seat for a thermoplastic energy absorber 30 which is fitted therein.

Figure 2:
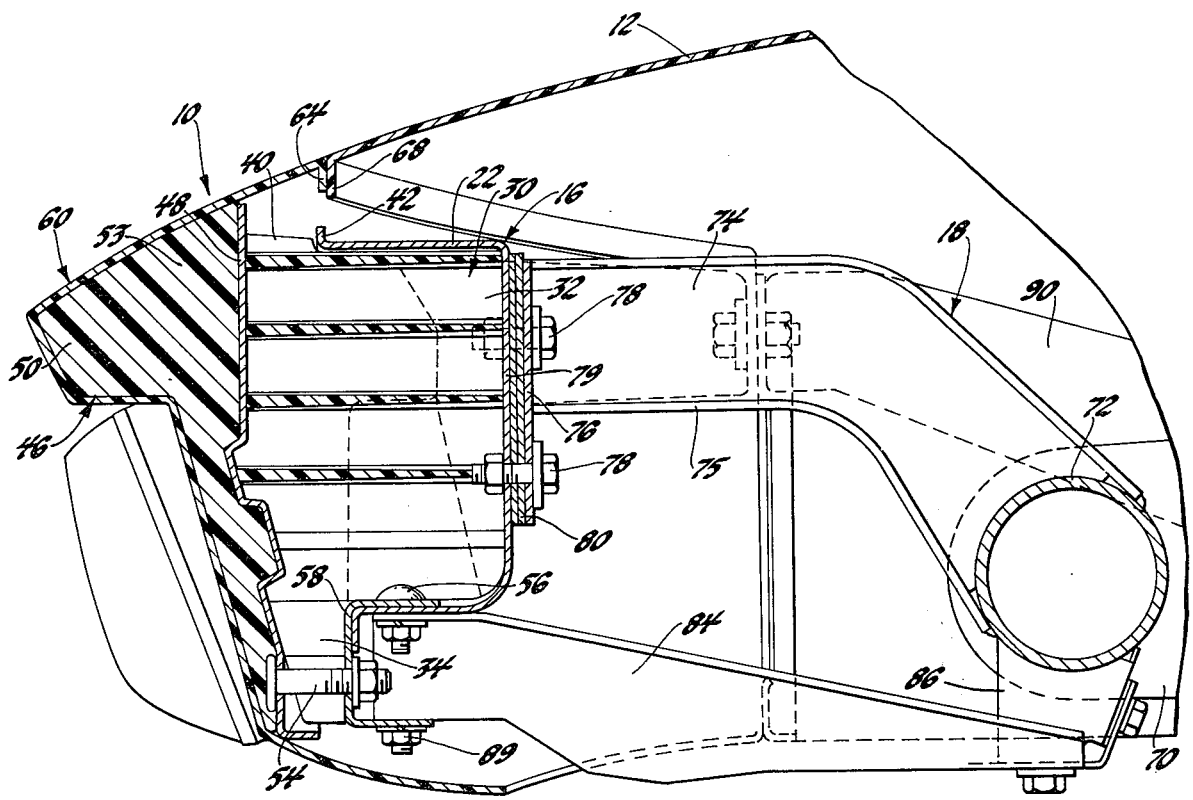
FIG. 2 is a sectional view taken generally along lines 2—2 of FIG. 1.
Figure 3:
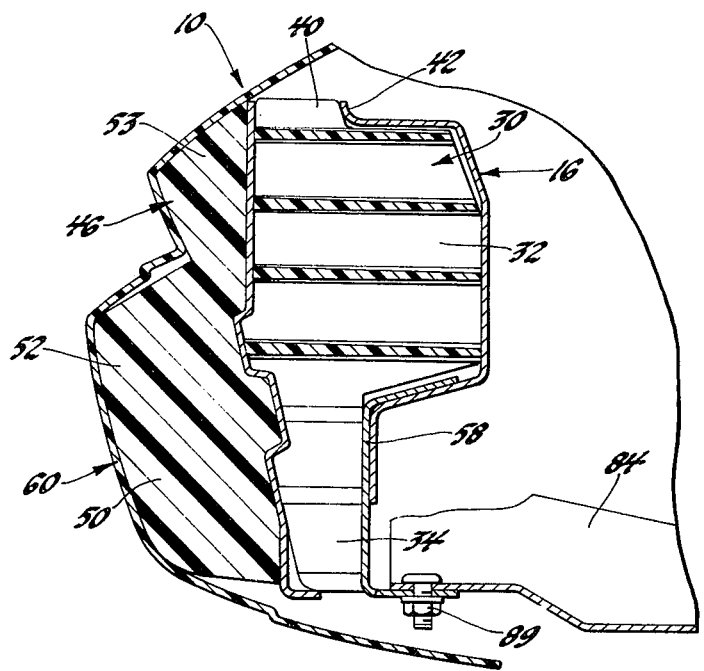
FIG. 3 is a sectional view taken along lines 3—3 of FIG. 1.
Figure 4:
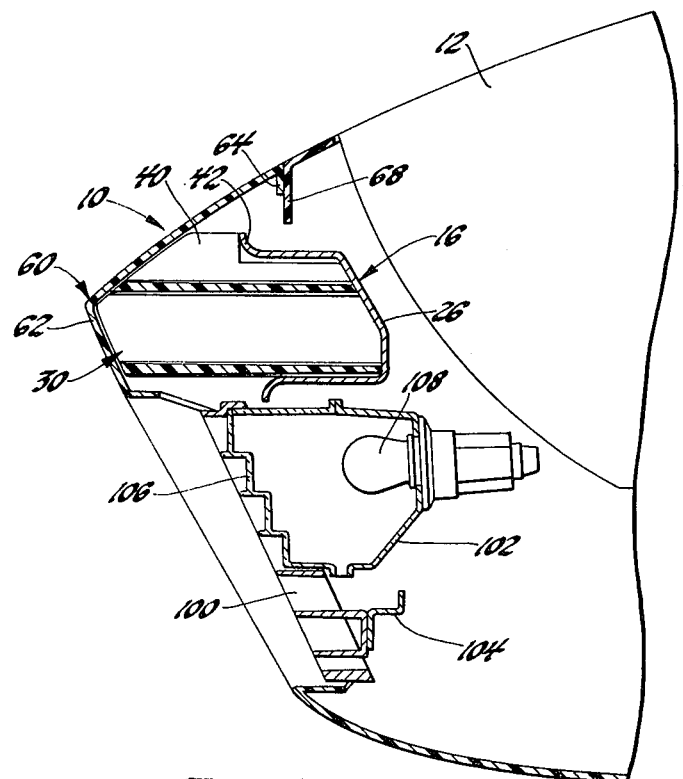
FIG. 4 is a view taken generally along lines 4—4 of FIG. 1.
Figure 5:
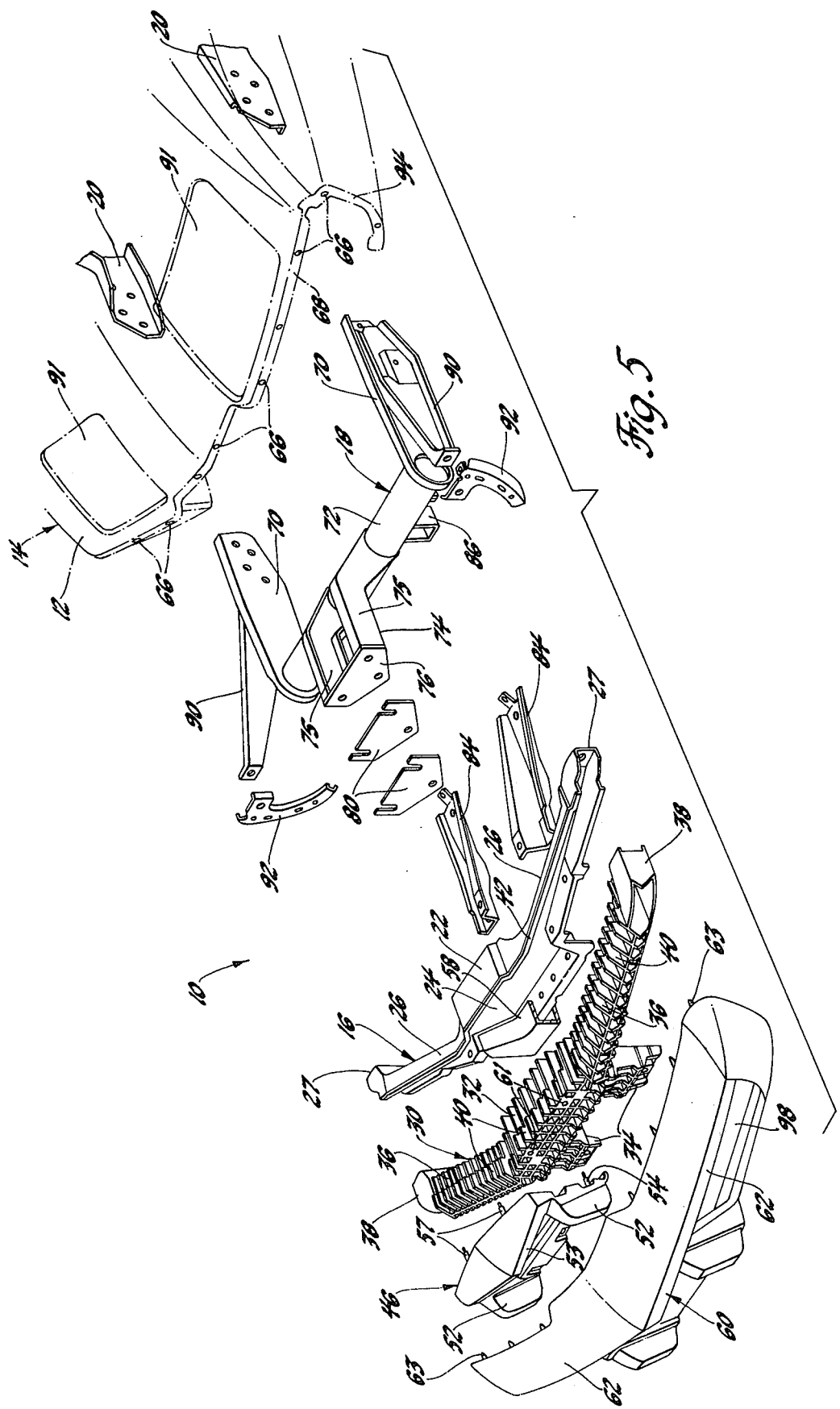
FIG. 5 is an exploded perspective view showing the components of the energy absorbing system of this invention and its connection with the vehicle body frame.

The energy absorber of this invention is preferably injection molded from an olefin copolymer plastic material or blended olefin material into a one-piece grid 30 of rectilinear, longitudinally-extending cells, the majority of which are open at both ends. This cellular grid 30 has a large, generally rectangular, central portion 32 with spaced downwardly extending legs 34, the central portion 32 and legs 34 fitting in the central pocket 24 of the support beam. The cells of the central portion of the energy absorbing grid are generally parallel with each other and are generally parallel to the longitudinal axis of the vehicle. As best shown in FIG. 5 the energy absorbing grid further has left and right wings 36 which sweep rearwardly at a low angle from the central portion to enlarged terminal end cells 38. The wings 36 of the energy absorber fit in the channel of the wing portions of the support beam 16. Each wing 36 of the energy absorbing grid has only a single row of longitudinally-extending cells as best shown in FIGS. 4 and 5 while the central portion has a plurality of rows of such cells. Both the central portion and the wings of the energy absorbing grid are formed with a plurality of vertically extending webs 40 which abut against a vertical flange portion 42 of the beam 16 as best shown in FIGS. 2, 3 and 4 for improved backing support of the grid. Since the grid extends forwardly from a recessed position to a location forwardly of the vehicle body the longitudinal dimension of the grid provides for improved absorption of impact energy without adversely affecting vehicle body lines.

The front of the central portion 32 of the cellular energy absorbing grid 30 provides a resilient backing surface for an impact force spreader plate assembly 46. This spreader plate assembly comprises a stamped steel backing plate 48 and a thick elastomeric bumper member 50 compression molded thereon. The elastomeric bumper member 50 is a resilient member and is formed with a pair of spaced, vertically-extending protrusions 52 which project forwardly and function as bumper guards. Additionally the bumper member 50 has an upper horizontal bar 53 interconnecting protrusions 52 that extend forwardly to withstand localized low speed impacts. The spreader plate assembly is seated on the front of the central portion 32 of the energy absorber 30 and is fastened to the support beam by suitable securing means such as bolt means 54 and 56 and front bracket means 58. Suitable fastener means such as bolt means 54 extend through openings formed in end walls in certain cells of the grid 30 to secure the grid to support beam 16. Bolt means or other suitable fasteners 57 extend from the spreader plate assembly through openings in the front end walls formed at the outer ends of cells 61 and through openings in the support beam and receive retainer nuts to secure the spreader plate assembly to the energy absorber 30 and the support beam.

To provide a finished streamlined appearance for the vehicle and to protect the energy absorber 32 and other inner components of the energy absorbing assembly, a shell-like flexible facia 60 is provided. Preferably facia 60 is injection molded into a one-piece cover from a suitable elastomeric material, such as thermoplastic urethane. This facia has left and right limb portions 62 which sweep rearwardly from a front center line to closely fit over the outer configuration of a spreader plate assembly and the wings 36 of the energy absorber. The facia is formed with an inwardly extending flange 64 around a portion of the perimeter thereof which supports mounting pads not shown having projecting fasteners 63 that fit into openings 66 formed in a front flange 68 of the body 12 to provide for the attachment of the facia to the vehicle body.

The support structure 18 for the energy absorbing assembly comprises a pair of forwardly extending arms 70 each of which is bolted at an inner end to a corresponding side rail 20 of the vehicle frame. The front ends of arms 70 support a horizontally extending center bar 72. Mounted on this center bar and projecting forwardly therefrom is a centralized mounting bracket 74 having a pair of forwardly extending arms 75 to which is secured a flat mounting plate 76. Bolt means 78, shown in FIG. 2, extend through this mounting plate and an end wall 79 of the support beam to fasten the support beam to the mounting plate. Shim plates 80 are employed between mounting plates 76 and the end wall of the support beam 16.

The support beam 16 is further connected to the center bar 72 by a first pair of reinforcing arms 84 which are bolted at one end to brackets 86 extending downwardly from the center bar 72. The forward ends of these arms are secured to bracket 58 by bolt means 89. Also bolt means 56 secures the flanged upper end of these reinforcing arms to the bottom of the support beam and to brackets 58 as best shown in FIG. 2. The support structure 18 further comprises a second pair of reinforcing arms 90 which are bolted at their inner ends to the extension arms 70 and extend forwardly at predetermined angles therefrom. The forward end of each reinforcing arm 90 is connected to a corresponding terminal end 27 of support beam 16. The vehicle 14 has headlamp assemblies 91 which are automatically concealed when not in use. The protected spaces encompassed by support beam 16, reinforcing arms 90, center bar 72 and support bracket 74 nest each headlamp assembly 91 in its closed position. Curved front brackets 92 secured to the front of each reinforcing arm 90 fit on the front end portions 94 of the vehicle body 12. These brackets which provide additional support of the facia 60 have suitable openings to receive the fasteners 63 projecting from the corresponding peripheral wall of the facia.

The facia 60 is formed with left and right openings 98 for left and right grills 100 and left and right parking lamp assemblies 102 secured in recesses in the grills. As shown in FIG. 4 each grill is disposed below the corresponding wing 36 of the energy absorber 30 and is secured to bracket 58 by connecting bracket 104. Each parking lamp assembly comprises a housing with a transparent front lens 106 for diffusing the light from bulb 108 when the bulb is energized.

The cellular grid 30 featured in this invention provides outstanding energy dissipation properties over a wide range of temperatures when deflected by straight ahead or angular impacts and has a gradual rate of recovery when the impact load is removed. The grid is preferably made in a reverse core mold comprising relatively movable first and second mold halves each with projecting and tapered mold cores which are laterally spaced with respect to each other when the mold halves are brought together. The spacing between the cores from the mold space for the grid. Also end walls are formed on predetermined cells of the grid when reverse core molded for front and rear attachment purposes.

Figure 6:
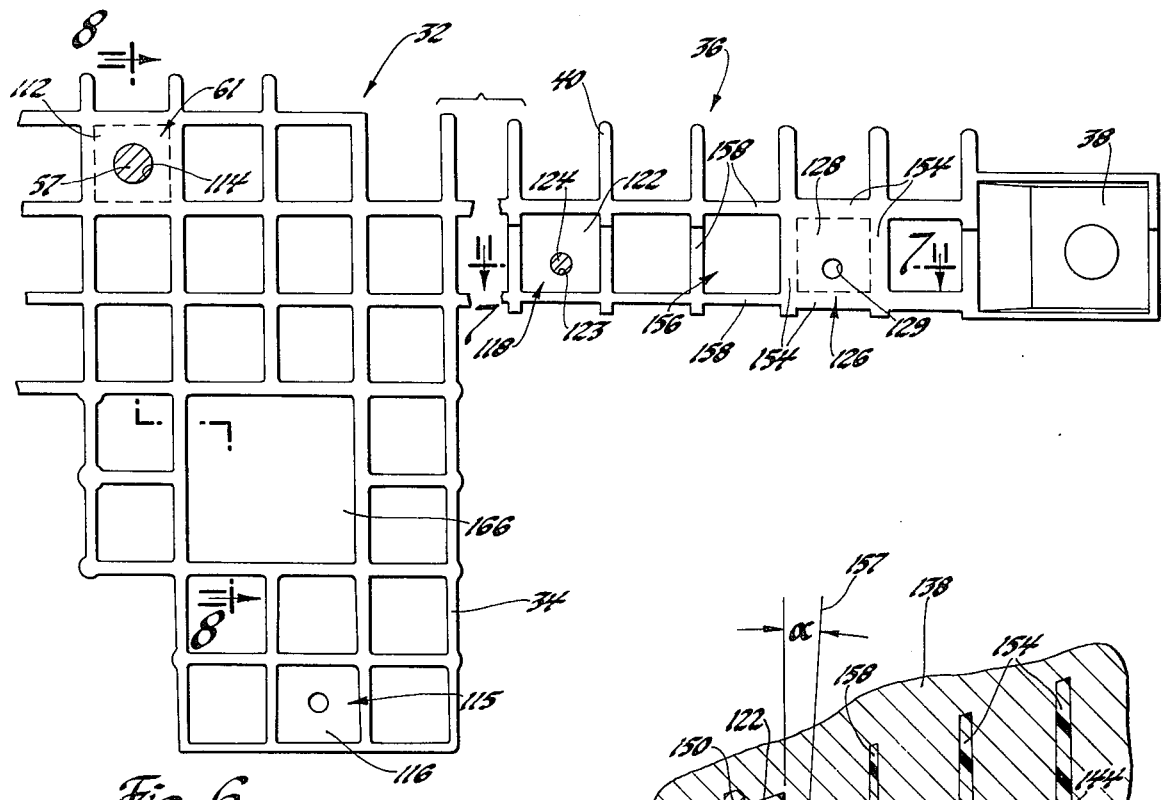
FIG. 6 is a front elevation view of a portion of the energy absorbing grid of this invention illustrating a modification thereof.

As best shown in FIG. 6, cell 61 of the central portion 32 of the grid has an integral forward end wall 112 with an annular opening 114 formed therein to receive the corresponding fastener 57 projecting from the spreader plate assembly 46. Also cell 115 has an integral rear end wall 116 with an opening therethrough to receive the fasteners 54 projecting from the spreader plate assembly. The wings 36 have corresponding cells such as cell 118 formed with integral rear wall 122 having annular opening 123 for receiving a fastener 124 projecting rearwardly through the support beam 16. The wings 36 further have cells such as cell 126 with an integral forward end wall 128 with a central hole 129 for receiving a fastener not shown that may project rearwardly from the facia or from a front finishing strip not shown that could be mounted on the facia 60.

Figure 7:
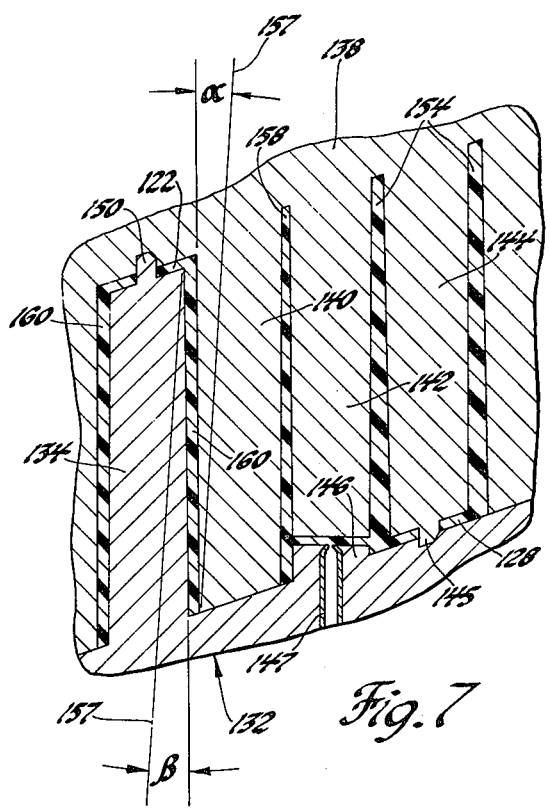
FIG. 7 is a sectional view of the energy absorbing grid taken generally along lines 7—7 of FIG. 6.
Figure 8:
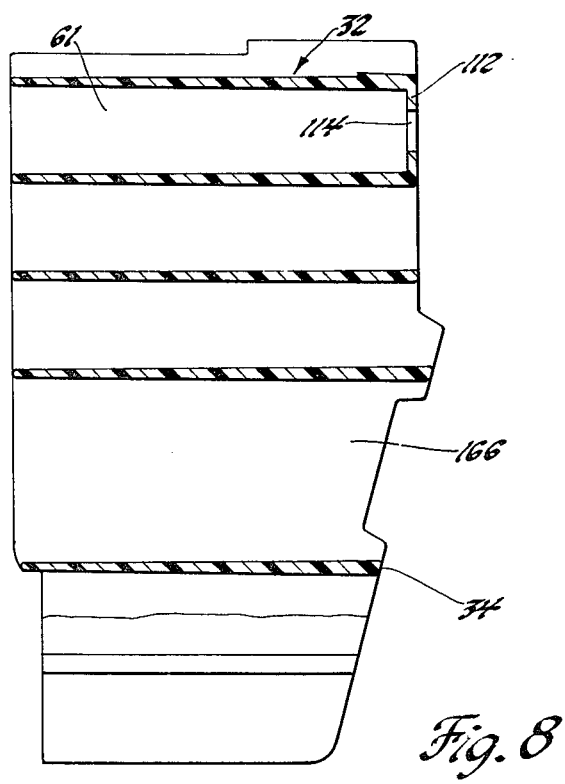
FIG. 8 is a sectional view of the energy absorbing grid of FIG. 6 taken generally along lines 8—8 of FIG. 6.

FIG. 7 shows a cross sectioned portion of one wing 36 and additionally shows the opposing cores of the mold to form the rear and front end walls on cells 118 and 126. The mold has a cover half 132 with rearwardly projecting cores such as tapered core 134 and an ejector half 138 with forwardly extending tapered cores such as cores 140, 142 and 144 each rectilinear in cross section. The cover half of the mold is moved axially with respect to the ejector half from an open or unloading position to a closed or molding position shown in FIG. 7. The space in the mold formed between the mold cores in their FIG. 7 position forms the mold space for the grid. After the mold halves are brought together the olefin material is injected into predetermined end wall spaces such as the space between the end of mold core 142 and an injection core 146 projecting from the cover half of the mold. Olefin material is fed through nozzles such as nozzle 147 extending through injection core 146 to this space and subsequently to the spacing between the cores to form the side walls of the cells as well as to form end walls such as walls 122 and 128 of cells 118 and 126 respectively. Mold core 134 has a pin 150 which fits into an aligned opening in the ejector half of the mold to form the opening in the end wall for fastener 124. Core 144 has a similar projecting pin 145 which fits into the cover half of the mold to form opening 129. After the olefin material has sufficiently cured, the cover half is moved axially to the open position so that the molded grid 30 can be forced from the ejector half of the mold.

While certain cells of grid 30 have end walls such as those for front and rear attachment purposes described above, the majority are open at both ends so that there is no excessive use of materials and no excessive dead weight added to the vehicle. The cells of grid 30 extend longitudinally from support beam 16 beyond the front of body 12 so there is sufficient space for grid deflection and absorption of impact energy before the vehicle body or other protected components are damaged. As shown best in FIGS. 3, 4, 7 and 8 the walls of each cell are formed with predetermined draft angles to facilitate removal of the grid from the ejector half 138 of the mold. The draft angle is also effectively used in this invention to tailor different portions of the grid to absorb different amounts of impact energy. For example the cells adjacent to the end of the grid such as cell 126 of the wing portion of the grid is formed with walls 154 having a relatively large draft angle so that there is a build up in wall thickness from the rear to the front of the grid. The large draft angle of these cells as compared to that of certain other cells, in conjunction with larger nominal wall thicknesses provide cells with a very high energy absorbing rate. After the smaller ends of such cells knee over, the remaining portion of these cells provides an increasing energy absorption rate and substantially higher forces are required to further deflect such cells to provide better protection for corner impacts. Since thick walls and wall thickness build up requires additional materials and adds to the weight and cost of the grid, other cells are tailored to have thinner walls and little or no build up in wall thickness where such high energy absorption rates are not needed. Thus, the cell 156 adjacent to cell 126 has three interior side walls 158 which are thinner and are formed with a smaller draft angle so that wall thickness build up is reduced. The effective energy absorption rate of such cells is reduced but is effective to meet predetermined barrier and other types of impact requirements.

If desired, the mold cores such as oppositely extending cores 134 and 140 can have the same draft or casting angles, shown in FIG. 7 as $\alpha$ and $\beta$ between the casting line 157 and the adjacent side wall of cell 118, so that the side walls 160 of this cell have no thickness build up and are therefore of uniform width to provide a uniform energy absorption rate.

In addition to tailoring the various portions of the grid to meet different energy absorbing requirements by using different draft angles for different cells, tailoring can be further accomplished by using different cell sizes. This is best illustrated in FIG. 6 in which a large square cell 166 is formed in the leg portion 34 of the grid surrounded by cells having a cross sectional area smaller than that of cell 166. Preferably the cells of both leg portions are identical in size and arrangement. While effective energy absorption is generally reduced using identical wall thickness and draft angle with such larger cell constructions, particular energy absorbing requirements are met optimizing use of materials and reducing weight.

In absorbing the energy of a low speed pendulum impact at the center line of the vehicle, the impacted portion of the facia and the entire spreader plate assembly are displaced rearwardly. This causes the inner ends of the cells of the central portion of the grid and seated on beam 16 to deflect. The end portion of the cell walls which radiate from an intersection column of four cells twist in a clockwise or counterclockwise direction and also buckle to a degree corresponding to the amount of energy applied to the grid. After the impact force is removed the cell walls gradually recover toward their free state position to substantially restore the spreader plate and the facia to their original positions.

In a similar manner low speed impact directed to either wing of the cellular grid causes the facia and the affected cells of the wing to deflect. The cell deflection is similar to that described above and impact energy is absorbed to prevent damage to the vehicle body and other vehicle components. After the impact force is removed the deflected cells recover and return the facia to its original position. The enlarged terminal cells 38 of each wing 36 are substantially larger than the other cells of the grid and have a different geometric configuration to tailor specific energy management characteristics to the terminal portion of the grid.

Although this invention is disclosed and described as an energy absorber for the front of a vehicle it can be readily employed in other desirable locations.

While a preferred embodiment of this invention has been shown and described to illustrate the invention, other embodiments and modifications will now be apparent to those skilled in the art. Accordingly, this invention is not limited by the description of the preferred embodiment, but only by the following claims:

We claim:

1. A resilient one piece energy absorbing grid for a vehicle for absorbing the energy of predetermined impacts of the vehicle comprising a central portion having a plurality of rows of longitudinally-extending cells each rectilinear in cross section and first and second wing portions respectively extending laterally from opposite sides of said central portion, each of said wing portions having a height less than the height of said central portion and having a row of longitudinally-extending cells rectilinear in cross section, a plurality of said cells of said central portion and said wing portions being open at both ends thereof, rear wall means integrally formed at the end of first cell means of said grid being in each of said wing portions, a support for said grid extending laterally of said vehicle and coextensive with said grid, fastener means extending from said support through said rear wall means to secure said grid to said support, second cell means of said grid being in said central portion, said second cell means having integral front wall means, separate plate means mounted on the front of said central portion of said grid for spreading impact loads applied to said central portion, and fastener means projecting from said plate means through said front wall means to secure said plate means to said energy absorbing grid.

2. A resilient one piece energy absorbing grid for a vehicle for absorbing the energy of predetermined impacts of the vehicle comprising a central portion having a plurality of rows of longitudinally-extending cells and first and second wing portions respectively extending laterally from opposite sides of said central portion, each of said wing portions having a single row of longitudinally-extending cells, said cells of said central portion and said wing portion being rectilinear in cross section, a plurality of said cells of said central portion and said wing portions being open at both ends thereof, rear wall means integrally formed at the end of first cell means of said grid in each of said wing portions, a rigid laterally extending support for said grid, fastener means extending from said support through said rear wall means to secure said grid to said support, second cell means of said grid being in said central portion and having integral front wall means, force spreading plate means mounted directly on the front of said central portion, fastener means projecting from said plate means through said front wall means to secure said plate means to said energy absorbing grid, said first cell means being adjacent to the ends of said laterally extending end portions and having wall means thicker than the wall means of the other cells of said grid to provide for increased energy absorption capacity to absorb the energy of corner impacts.

3. In combination with a vehicle, a laterally extending rigid support on said vehicle, a one-piece resilient cellular grid of resilient material mounted on said support for absorbing the energy of vehicle impact, said grid being coextensive with the lateral extent of said rigid support, said grid comprising a plurality of cell means extending longitudinally a predetermined distance from the body of said vehicle, each of said cell means being rectilinear in cross section and having side wall means disposed generally at right angles to each other, a plurality of said cell means being fully open at the front and rear ends thereof, a first number of said plurality of said cell means being substantially identical in cross sectional area and length to form first buckling columns to absorb predetermined impact forces applied thereto, a second number of said plurality of said cell means being substantially larger in cross sectional area than said first number of said cell means to form second buckling columns to absorb impact forces lower than said predetermined impact forces.

4. A resilient one piece energy absorbing grid for a vehicle for absorbing the energy of vehicle impact comprising a central portion and left and right laterally extending wing portions, said grid extending substantially across one end of the vehicle and having a plurality of longitudinally extending cell means open at both ends, each of said cell means having longitudinally extending side walls and each being rectilinear in cross section, said side walls of a first of said cell means having a first draft angle to provide a build up of side wall thickness from one end of said first cell means to the other to provide a first impact energy absorption rate, said side walls of a second of said cell means having draft angle smaller than that of said first cell means so that predetermined side walls thereof have a thickness less than the side walls of said first cell means to provide a second energy absorption rate, and said side walls of a third of said cell means having side walls of uniform thickness to provide a third energy absorption rate.

5. The energy absorbing grid of claim 4 wherein the outer sides of the walls of said third cell means have a draft angle equal to the draft angle of the inner side of the walls of said third cell means and extend from the front end of said grid to provide said walls of uniform thickness.

* * * * *